(12) United States Patent
Bolen et al.

(10) Patent No.: US 11,016,923 B1
(45) Date of Patent: May 25, 2021

(54) CONFIGURING HOT-INSERTED DEVICE VIA MANAGEMENT CONTROLLER

(71) Applicant: Dell Products L.P., Round Rock, TX (US)

(72) Inventors: Austin P. Bolen, Austin, TX (US); Syama Sundar Poluri, Round Rock, TX (US); Chandrashekar Nelogal, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/692,180

(22) Filed: Nov. 22, 2019

(51) Int. Cl.
*G06F 13/40* (2006.01)
*G06F 3/06* (2006.01)
*G06F 9/4401* (2018.01)

(52) U.S. Cl.
CPC .......... *G06F 13/4081* (2013.01); *G06F 3/061* (2013.01); *G06F 3/0622* (2013.01); *G06F 3/0658* (2013.01); *G06F 9/4403* (2013.01); *G06F 3/0679* (2013.01); *G06F 2213/0026* (2013.01)

(58) Field of Classification Search
CPC ....... G06F 13/40; G06F 13/24; G06F 13/4081
See application file for complete search history.

(56) References Cited

U.S. PATENT DOCUMENTS

| | | | |
|---|---|---|---|
| 2015/0156212 A1* | 6/2015 | Khatri | H04L 63/1416 726/23 |
| 2016/0378570 A1* | 12/2016 | Ljubuncic | G06F 9/5027 718/104 |
| 2017/0010899 A1* | 1/2017 | Dasar | G06F 9/4416 |
| 2017/0134217 A1* | 5/2017 | Ahmed | H04L 41/044 |
| 2018/0173664 A1* | 6/2018 | Am | G06F 13/24 |
| 2018/0341614 A1* | 11/2018 | Khatri | G06F 13/4068 |
| 2020/0226093 A1* | 7/2020 | Butcher | G06F 15/17337 |

\* cited by examiner

*Primary Examiner* — Getente A Yimer
(74) *Attorney, Agent, or Firm* — Jackson Walker L.L.P.

(57) ABSTRACT

An information handling system may include a processor, a basic input/output system (BIOS) configured to initialize the information handling system, and a management controller coupled to the processor and configured to provide out-of-band management of the information handling system. The BIOS may be configured to: subsequent to initialization of an operating system of the information handling system, receive a notification that an information handling resource has been hot-inserted into the information handling system; and delay processing of the information handling resource by the operating system until the management controller has performed a platform-specific configuration change to the information handling resource.

16 Claims, 3 Drawing Sheets

CONFIGURING HOT-INSERTED DEVICE VIA MANAGEMENT CONTROLLER

TECHNICAL FIELD

The present disclosure relates in general to information handling systems, and more particularly to configuration of hot-inserted information handling resources.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Various problems are known in the field of hot-inserting information handling resources into an information handling system, also referred to as hot-plugging. Generally speaking, these terms refer to the attachment of an information handling resource after the system is already turned on (e.g., after an operating system (OS) has been booted).

In the context of attaching information handling resources before OS initialization, in contrast, many of the problems are not applicable. For example, when a system is booted with a PCI Express (PCIe) device already installed, the platform firmware (e.g., the BIOS) can make any needed platform-specific configuration changes to the device before giving control to the OS. However, when a PCI Express device is hot-inserted, the OS is notified immediately, and thus the BIOS may not have an opportunity to perform any platform-specific changes. This problem may be particularly evident in the case of hot-inserted NVM Express devices.

In the software RAID context for serial ATA (SATA) devices, the BIOS may change the class code for the SATA (AHCI) controller in the chipset to indicate that it is a RAID device. The OS may then choose a software RAID driver that claims the RAID controller, rather than loading a native inbox AHCI driver. When SATA drives are inserted and removed at runtime, the SATA controller in the chipset remains present at all times, and hence the software RAID driver may remain active and able to control any SATA device that is inserted or removed at runtime.

In case of NVMe devices, however, the controller is generally part of the device itself. Thus while the BIOS may be able to change the class code if the device is present upon boot, this is not possible for NVMe devices that are hot-inserted. Rather, the OS may be notified of the hot-insertion immediately via a hot-plug interrupt, and the BIOS may not have time to change the class code of the NVMe controller to RAID. Further, there is no mechanism to notify the BIOS when devices are hot-inserted, because the OS takes native control of the hot-plug interrupts. The result is that the OS may undesirably load its native inbox NVMe driver instead of the software RAID driver on newly inserted NVMe devices, rendering the devices unusable.

A similar problem exists with cryptographically protected NVMe devices (e.g., devices locked according to a Trusted Computing Group (TCG) standard). If the device is present during boot, the BIOS or a management controller may unlock the device prior to any attempted access by the OS. But if the device is hot-inserted, the OS is immediately notified by the hot-plug interrupt, and therefore the BIOS and/or management controller does not have time to unlock it before the OS attempts to access it. This will result in the OS attempting to perform I/O and seeing I/O failures, as the drive is locked. Thus it would be advantageous to have a mechanism to allow the management controller to retrieve cryptographic keys from an external key management server and unlock the storage device before the OS attempts to access it.

Although this disclosure generally discusses NVMe drives for the sake of concreteness, there are also other situations in which it may be the case that the BIOS and/or management controller may need to take actions after a device is hot-inserted.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with configuration of hot-inserted information handling resources may be reduced or eliminated.

In accordance with embodiments of the present disclosure, an information handling system may include a processor, a basic input/output system (BIOS) configured to initialize the information handling system, and a management controller coupled to the processor and configured to provide out-of-band management of the information handling system. The BIOS may be configured to: subsequent to initialization of an operating system of the information handling system, receive a notification that an information handling resource has been hot-inserted into the information handling system; and delay processing of the information handling resource by the operating system until the management controller has performed a platform-specific configuration change to the information handling resource.

In accordance with these and other embodiments of the present disclosure, an information handling system may include a processor, a basic input/output system (BIOS) configured to initialize the information handling system, and a management controller coupled to the processor and configured to provide out-of-band management of the information handling system. The management controller may be configured to: subsequent to initialization of an operating system of the information handling system, receive a first notification that an information handling resource has been hot-inserted into the information handling system; perform a platform-specific configuration change to the information handling resource; and transmit a second notification to the operating system that the platform-specific configuration change has been completed.

In accordance with these and other embodiments of the present disclosure, a method may include steps related to the information handling systems mentioned above.

In accordance with these and other embodiments of the present disclosure, an article of manufacture may include a non-transitory, computer-readable medium having computer-executable code thereon that is executable by a processor for carrying out operations related to the information handling systems mentioned above.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
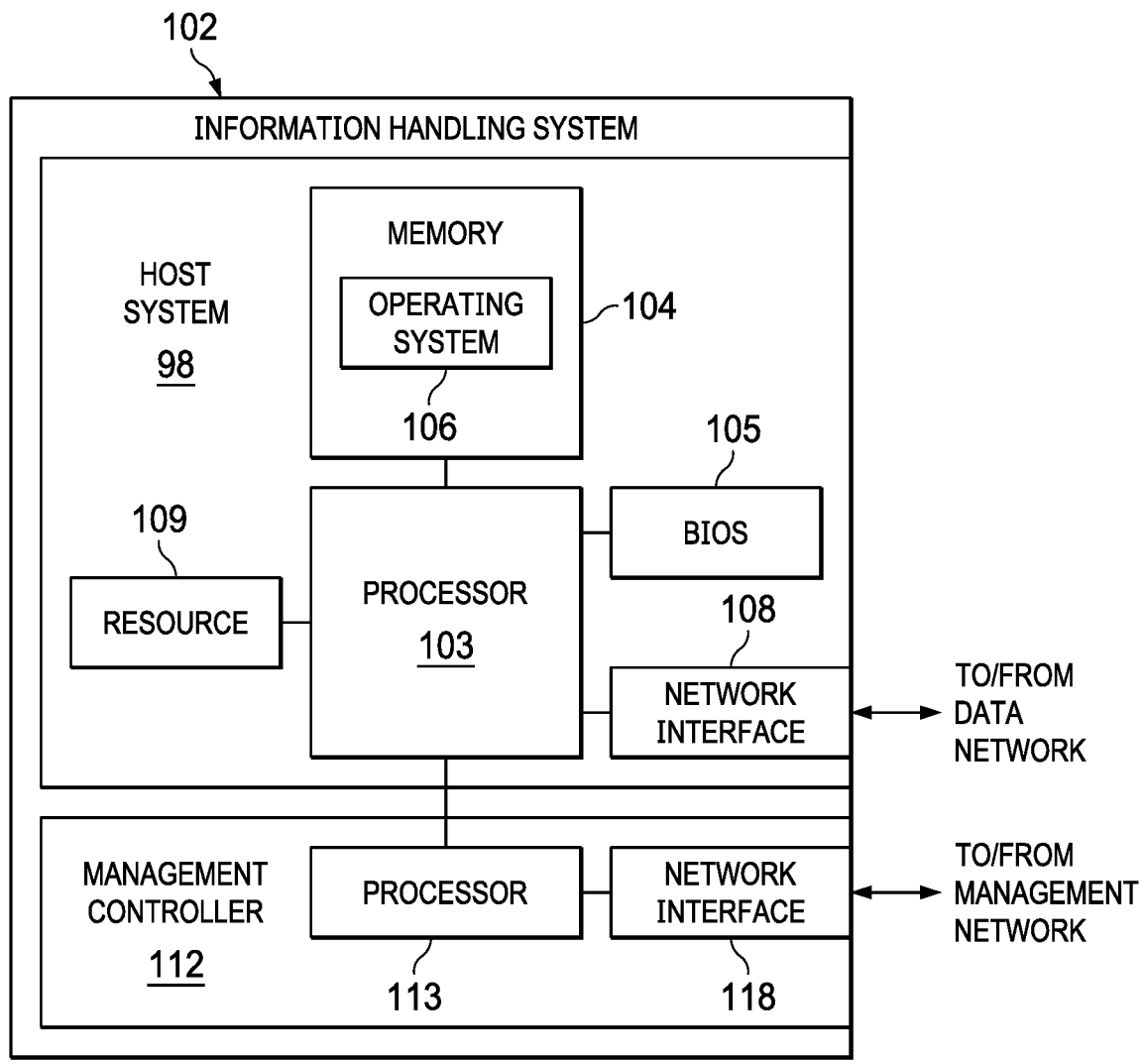
FIG. 1 illustrates a block diagram of an example information handling system, in accordance with embodiments of the present disclosure.
Figure 2:
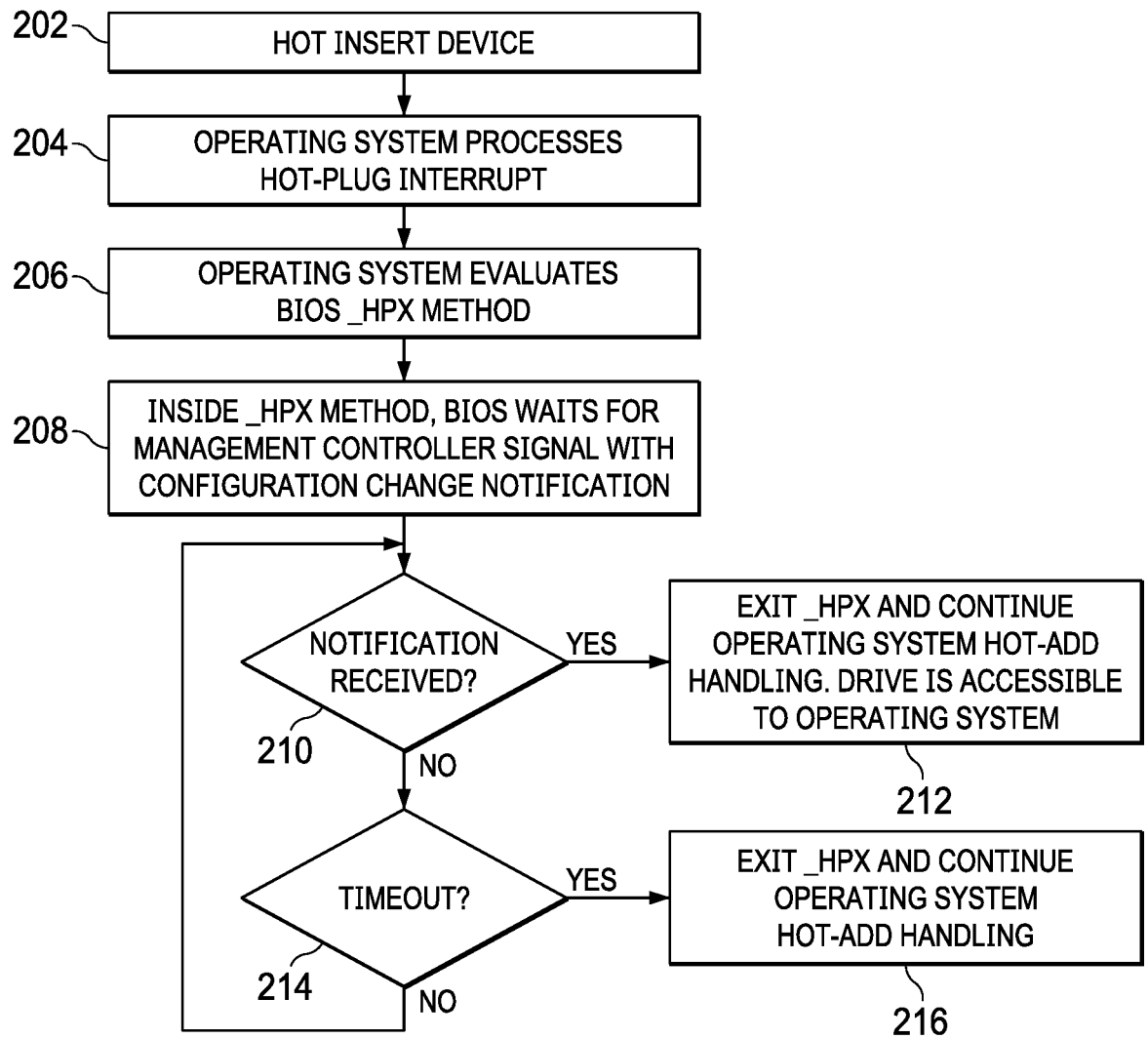
FIG. 2 illustrates an example flow diagram of a method in accordance with embodiments of the present disclosure.
Figure 3:
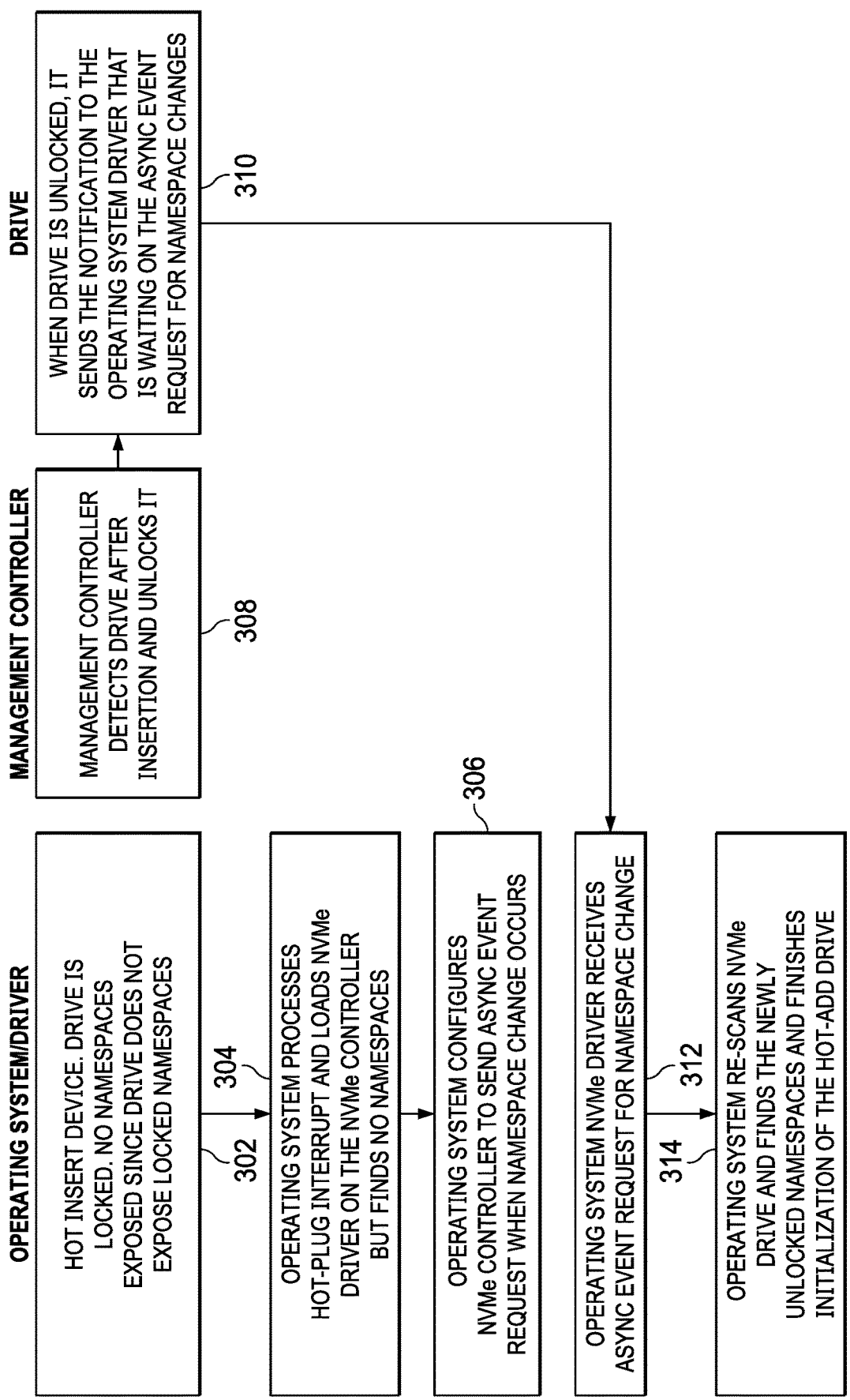
FIG. 3 illustrates an example flow diagram of a method in accordance with embodiments of the present disclosure.

Preferred embodiments and their advantages are best understood by reference to FIGS. 1 through 3, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

Host system 98 may also include information handling resource 109. Information handling resource 109 may be coupled to processor 103 (e.g., via a PCI interface, a PCIe interface, a USB interface, or any other suitable communications interface). For example, information handling resource 109 may be a PCIe storage device such as an NVMe drive. In particular, information handling resource 109 may be a hot-insertable resource. In some embodiments, it may be desirable to perform a platform-specific configuration change to information handling resource 109 when it is inserted. As discussed in more detail below, various embodiments of this disclosure provide ways of accomplishing such changes through the use of BIOS 105 and/or management controller 112.

Turning now to FIG. 2, a flow chart is shown of an example method 200 for performing a platform-specific configuration change to a hot-inserted device, according to a first embodiment. Some embodiments of method 200 may make use of Advanced Configuration and Power Interface (ACPI) functionality defined by an ACPI Specification, as will be understood by one of ordinary skill in the art with benefit of this disclosure. For example, some embodiments may utilize an _HPX (Hot Plug Parameter eXtension) method provided by ACPI, which is typically called by an operating system when a device is hot-plugged.

The _HPX method may be provided by the BIOS, and the operating system may call the method whenever a PCIe device is hot-inserted. The BIOS may add a delay in the _HPX method to allow time for a management controller to detect the hot-inserted device (e.g., over an SMBus interface) and perform platform-specific configuration changes. In some embodiments, this delay may be a hard-coded, predetermined amount of time such as five seconds. For example, a management controller may be configured to poll for hot-inserted devices periodically, and so a predetermined delay may be established based on such a polling interval.

In other embodiments, the delay may be implemented by waiting for the BIOS to receive a signal (e.g., a system management interrupt) indicating that the management controller has completed the configuration change. In other embodiments, such a signal may include setting a flag or register value, storing information in a shared memory area, etc.

At step 202, a device is hot-inserted into an information handling system (e.g., information handling system 102). As noted above, typically the operating system will receive notification immediately (or substantially immediately) in the form of a hot-plug interrupt. At step 204, the OS may process this interrupt.

As part of the processing of the hot-plug interrupt, at step 206, the OS may call into the BIOS with the _HPX ACPI function.

Once the BIOS has begun executing the _HPX function, at step 208, the BIOS may implement a delay functionality to allow the management controller to perform a platform-specific configuration change. At steps 210 and 214, the BIOS may enter a loop to await a notification that the configuration change (e.g., a platform-specific configuration change such as changing a class code or unlocking a drive) has been completed.

At step 212, once the notification is received, the BIOS may complete processing of the _HPX method and return control to the OS. The platform-specific configuration change has been accomplished, and so the information handling resource is accessible to the OS.

If no notification is received, eventually a timeout may occur, and the BIOS may then complete processing of the _HPX method and return to the OS regardless of whether the configuration change has been successfully completed. In some embodiments, this timeout may be used in lieu of a signaling method from the management controller to the BIOS (e.g., the BIOS may wait a predetermined amount of time to allow the configuration change to complete, and then assume that it has been completed). In this case, the drive is also accessible to the OS.

In other embodiments, the timeout may be indicative of a problem with the platform-specific configuration change. For example, if no network connection is available, then it may not be possible to unlock the drive. In such a case, then the BIOS may use the timeout functionality as a safeguard to ensure that processing of the configuration change is abandoned and a system hang is prevented. Control may return to the OS despite the fact that the change has not been completed.

Turning now to FIG. 3, a flow chart is shown of an example method 300 for performing a platform-specific configuration change to a hot-inserted device, according to a second embodiment. Some embodiments of method 300 may make use of an NVMe Asynchronous Event Request (AER) mechanism. For example, in some embodiments, an AER such as a namespace change notification may be utilized.

In method 300, the situation of a locked NVMe drive is depicted. The same or similar methods may also be used for enabling a RAID drive or other types of platform-specific configuration changes.

At step 302, a locked NVMe drive is hot-inserted into an information handling system. In some embodiments, initially no namespaces are exposed. In other embodiments, namespaces may be exposed but not usable because they have not been unlocked yet.

At step 304, the operating system processes a hot-plug interrupt and loads an NVMe driver for the NVMe controller. At step 306, the OS may configure the NVMe controller to send an AER when any namespace changes occur.

Meanwhile, at step 308, a management controller may detect the insertion of the drive. This detection may be accomplished via periodic polling, a notification from the OS, etc. Once the management controller has detected the drive, it may unlock it (e.g., by downloading a cryptographic key from a remote information handling system, etc.).

Once the drive is unlocked, it may send a notification to the OS driver at step 310.

The OS driver may receive such notification at step 312 and trigger a re-scan of the drive at step 314. The newly unlocked namespace(s) may then be found and initialized.

As noted above, method 300 may use an AER such as a namespace change notification to notify the OS that the drive has been unlocked. In some embodiments, such a notification may automatically trigger the OS to re-scan the drive.

In other embodiments, however, the OS may determine that no namespaces have actually been created or deleted, and thus it may ignore the AER and decline to re-scan the drive. In such embodiments, it may be advantageous for the drive to initially report that no namespaces are present. Alternatively, a new AER may be defined according to the NVMe specification in order to allow for notifying the OS of a security state change on the drive (as opposed to notifying the OS of a namespace change, which some OSes might effectively ignore). As yet another embodiment, the OS itself may be modified to ensure that the namespace change notification is respected and triggers a re-scan, even if no namespaces have actually been created or deleted.

One of ordinary skill in the art with the benefit of this disclosure will understand that the preferred initialization point for the methods depicted in FIGS. 2-3 and the order of the steps comprising those methods may depend on the implementation chosen. In these and other embodiments, this method may be implemented as hardware, firmware, software, applications, functions, libraries, or other instructions. Further, although FIGS. 2-3 disclose a particular number of steps to be taken with respect to the disclosed methods, the methods may be executed with greater or fewer steps than those depicted. The methods may be implemented using any of the various components disclosed herein (such as the components of FIG. 1), and/or any other system operable to implement the method.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
a processor;
a basic input/output system (BIOS) configured to initialize the information handling system; and
a management controller coupled to the processor and configured to provide out-of-band management of the information handling system;
wherein the BIOS is configured to:
  subsequent to initialization of an operating system of the information handling system, receive a notification that an information handling resource has been hot-inserted into the information handling system, wherein the information handling resource is cryptographically protected; and
  delay processing of the information handling resource by the operating system until the management controller has performed a platform-specific configuration change to the information handling resource that includes unlocking the information handling resource;
wherein the management controller is further configured to retrieve, from a remote information handling system, a cryptographic key usable to perform the unlocking.

2. The information handling system of claim 1, wherein the BIOS is a Unified Extensible Firmware Interface (UEFI) BIOS.

3. The information handling system of claim 1, wherein the information handling resource is a Peripheral Component Interconnect Express (PCIe) resource.

4. The information handling system of claim 1, wherein the information handling resource is a storage resource.

5. The information handling system of claim 4, wherein the storage resource is a Non-Volatile Memory Express (NVMe) storage resource having a storage controller included therein.

6. The information handling system of claim 5, wherein the platform-specific configuration change includes changing a class code of the NVMe storage resource.

7. The information handling system of claim 1, wherein the delaying includes delaying for a predetermined amount of time.

8. The information handling system of claim 1, wherein the delaying includes delaying until the BIOS receives a system management interrupt from the management controller that the platform-specific configuration change has been completed.

9. An information handling system comprising:
a processor;
a basic input/output system (BIOS) configured to initialize the information handling system; and
a management controller coupled to the processor and configured to provide out-of-band management of the information handling system;
wherein the management controller is configured to:
  subsequent to initialization of an operating system of the information handling system, receive a first notification that an information handling resource has been hot-inserted into the information handling system, wherein the information handling resource is cryptographically protected;
  retrieve, from a remote information handling system, a cryptographic key usable to unlock the information handling resource;
  perform a platform-specific configuration change to the information handling resource that includes unlocking the information handling resource; and
  transmit a second notification to the operating system that the platform-specific configuration change has been completed.

10. The information handling system of claim 9, wherein the BIOS is a Unified Extensible Firmware Interface (UEFI) BIOS.

11. The information handling system of claim 9, wherein the information handling resource is a Peripheral Component Interconnect Express (PCIe) resource.

12. The information handling system of claim 9, wherein the information handling resource is a storage resource.

13. The information handling system of claim 12, wherein the storage resource is a Non-Volatile Memory Express (NVMe) storage resource having a storage controller included therein.

14. The information handling system of claim 13, wherein the platform-specific configuration change includes changing a class code of the NVMe storage resource.

15. The information handling system of claim 13, wherein the operating system is configured to initialize the NVMe storage resource prior to completion of the platform-specific configuration change, and wherein the NVMe storage resource is not usable for storage operations by the operating system until after the completion of the platform-specific configuration change.

16. The information handling system of claim 15, wherein the second notification transmitted to the operating system comprises an asynchronous event request transmitted to a storage driver of the operating system.

* * * * *